United States Patent
Murchison

(10) Patent No.: US 12,130,602 B2
(45) Date of Patent: Oct. 29, 2024

(54) SYSTEMS AND TECHNIQUES FOR VALIDATING A SIMULATION FRAMEWORK

(71) Applicant: GM Cruise Holdings LLC, San Francisco, CA (US)

(72) Inventor: Luke Murchison, Belmont, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 197 days.

(21) Appl. No.: 18/076,013

(22) Filed: Dec. 6, 2022

(65) Prior Publication Data

US 2024/0184258 A1 Jun. 6, 2024

(51) Int. Cl.
*G05B 17/02* (2006.01)
*B60W 60/00* (2020.01)

(52) U.S. Cl.
CPC ........... *G05B 17/02* (2013.01); *B60W 60/001* (2020.02)

(58) Field of Classification Search
CPC .............................. G05B 17/02; B60W 60/001
See application file for complete search history.

(56) References Cited

U.S. PATENT DOCUMENTS

| | | | |
|---|---|---|---|
| 11,436,484 B2* | 9/2022 | Farabet | G06V 10/454 |
| 12,005,922 B2* | 6/2024 | Misu | G06F 30/27 |
| 12,017,679 B2* | 6/2024 | Natarajan | B60W 60/001 |
| 2020/0033866 A1* | 1/2020 | Song | G06N 3/08 |
| 2020/0409380 A1* | 12/2020 | Song | B60W 50/06 |
| 2021/0116915 A1* | 4/2021 | Jiang | B60W 60/0027 |
| 2022/0122001 A1* | 4/2022 | Choe | G06N 20/20 |
| 2022/0204020 A1* | 6/2022 | Misu | B60W 60/001 |
| 2023/0064387 A1* | 3/2023 | Raichelgauz | B60W 60/00 |

* cited by examiner

*Primary Examiner* — Richard M Camby

(57) ABSTRACT

Systems and techniques are provided for validating a simulation framework. An example method includes performing a first plurality of simulations corresponding to a plurality of software versions, wherein the first plurality of simulations use a first simulation framework configured to test a simulation scenario; detecting, based on the first plurality of simulations, a first change in a simulation metric associated with the simulation scenario among a portion of the plurality of software versions; performing a second plurality of simulations corresponding to the portion of the plurality of software versions, wherein the second plurality of simulations use a second simulation framework configured to test the simulation scenario; determining, based on the second plurality of simulations, a second change in the simulation metric; and comparing the first change in the simulation metric with the second change in the simulation metric to determine a reliability metric corresponding to the second simulation framework.

20 Claims, 5 Drawing Sheets

SYSTEMS AND TECHNIQUES FOR VALIDATING A SIMULATION FRAMEWORK

BACKGROUND

1. Technical Field

The present disclosure generally relates to autonomous vehicles and, more specifically, to systems and techniques for validating a simulation framework.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
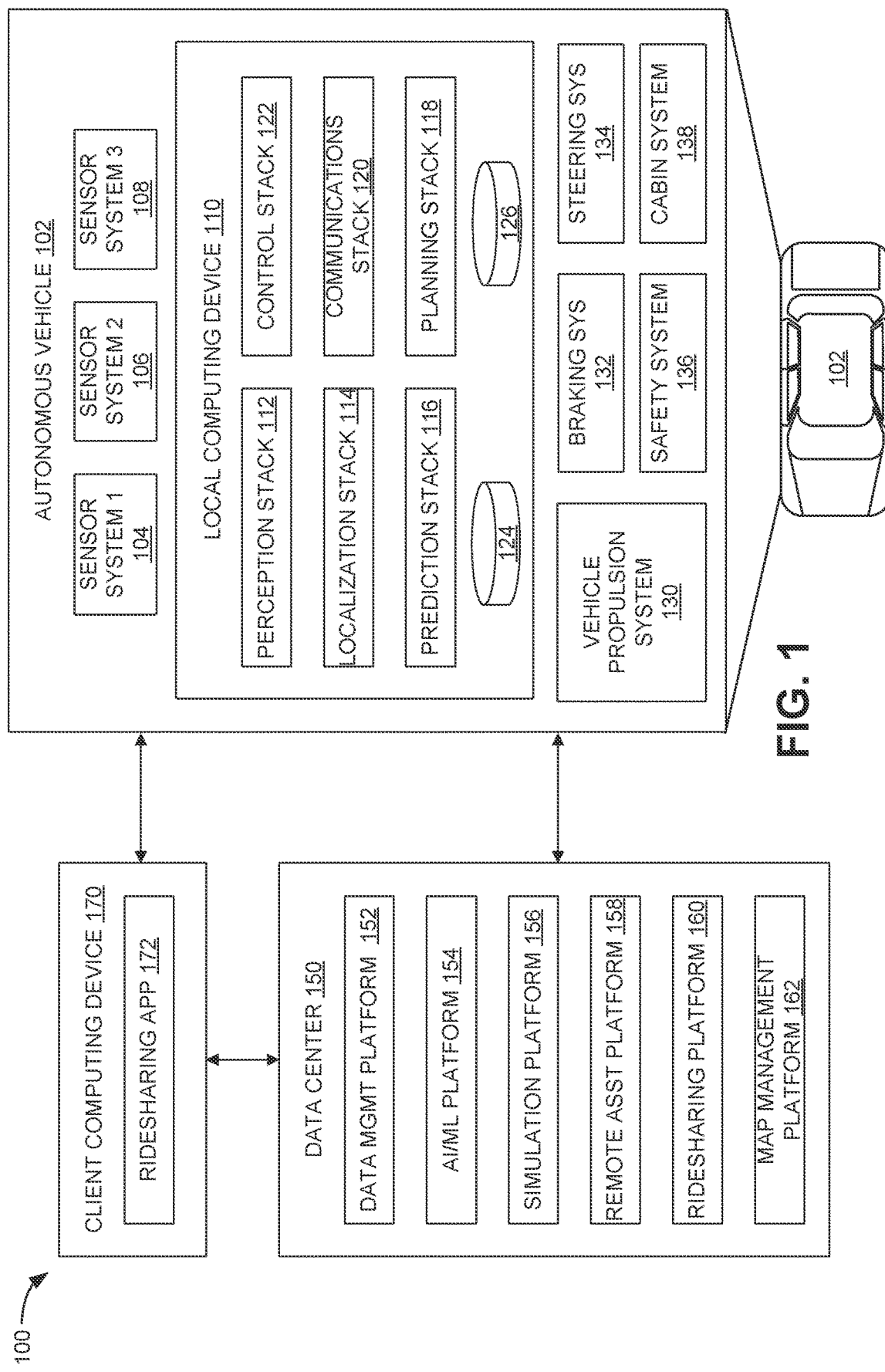
FIG. 1 is a diagram illustrating an example system environment that can be used to facilitate autonomous vehicle (AV) navigation and routing operations, in accordance with some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Autonomous vehicles (AVs), also known as self-driving cars, driverless vehicles, and robotic vehicles, are vehicles that use sensors to sense the environment and move without human input. For example, AVs can include sensors such as a camera sensor, a LIDAR sensor, and/or a RADAR sensor, amongst others, which the AVs can use to collect data and measurements that are used for various AV operations. The sensors can provide the data and measurements to an internal computing system of the autonomous vehicle, which can use the data and measurements to control mechanical systems of the autonomous vehicle, such as a vehicle propulsion system, a braking system, and/or a steering system, etc.

In some cases, AV software can be tested using different simulation frameworks. For example, a replay simulation framework can be used to create simulations that use real-world AV data. In some aspects, a replay simulation framework can provide accurate simulation results because the behavior of the simulated AV can be easily compared to the real-world behavior of the AV. In addition, a replay simulation framework may provide accurate simulation results because the AV software that is being tested (e.g., perception stack, planning stack, controls stack, etc.) receives and processes data corresponding to real-world sensor measurements (e.g., LiDAR sensor data, RADAR sensor data, camera sensor data, etc.).

In some aspects, AV software can also be tested using a synthetic simulation framework that is used to create simulations based on synthetic data (e.g., simulated sensor data provided as input to AV software). In some cases, a synthetic simulation framework may be required to test AV software that cannot be tested using a replay simulation framework. For example, AV software associated with next-generation AVs that are fully autonomous and do not have a steering wheel may be tested using a synthetic simulation framework prior to being deployed to an AV in a real-world environment. Consequently, it is important to validate the reliability of synthetic simulation frameworks to ensure that it can accurately capture or identify any performance degradations.

Systems and techniques are provided herein for validating a simulation framework. In some aspects, regressions that are observed in a replay simulation framework can be leveraged to validate a synthetic simulation framework. For example, a regression in a replay simulation framework can be observed based on a change in one or more simulation parameters (e.g., safety score, AV behavior, etc.). For example, a first test using the replay simulation framework can yield a safety score of 1 and a second test using the replay simulation framework can yield a safety score of 0.5 (e.g., a delta of 0.5).

In some aspects, the software versions associated with the first test and the second test can be executed using a synthetic simulation framework to determine whether the synthetic simulation framework yields a similar change or performance degradation (e.g., regression). In some cases, the synthetic simulation framework may be validated if the delta or regression observed using the synthetic simulation framework is the same or similar (e.g., within a threshold value or percentage) to the delta or regression observed using the replay simulation framework. Alternatively, one or more fidelity issues may be present in the synthetic simulation framework if the delta or regression observed using the synthetic simulation framework is different (e.g., greater than a threshold value or percentage) to the delta or regression observed using the replay simulation framework.

In some aspects, the present technology can be used to validate a synthetic simulation framework as well as numerous tests executed therein. In some examples, the present technology provides a technique for validating a synthetic simulation framework based on observed regressions which reduces the need to convert most of the tests from the replay simulation framework to the synthetic simulation framework. That is, the present technology reduces the cost, effort, time, and computation resources needed to validate a synthetic simulation framework by reducing the number of tests that need to be converted. In addition, the present technology improves the reliability of simulation frameworks (e.g., validates a synthetic simulation framework) such that software can be reliably tested prior to being deployed into a real-world environment. Improving the accuracy of simulation frameworks is desirable because it helps reduce development time, improves performance, minimizes safety issues, etc.

FIG. 1 is a diagram illustrating an example autonomous vehicle (AV) environment 100, according to some examples of the present disclosure. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (Saas) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some aspects, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit en route to a pick-up or drop-off location, and so on.

While the autonomous vehicle 102, the local computing device 110, and the autonomous vehicle environment 100 are shown to include certain systems and components, one of ordinary skill will appreciate that the autonomous vehicle 102, the local computing device 110, and/or the autonomous vehicle environment 100 can include more or fewer systems and/or components than those shown in FIG. 1. For example, the autonomous vehicle 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 5.

Figure 2:
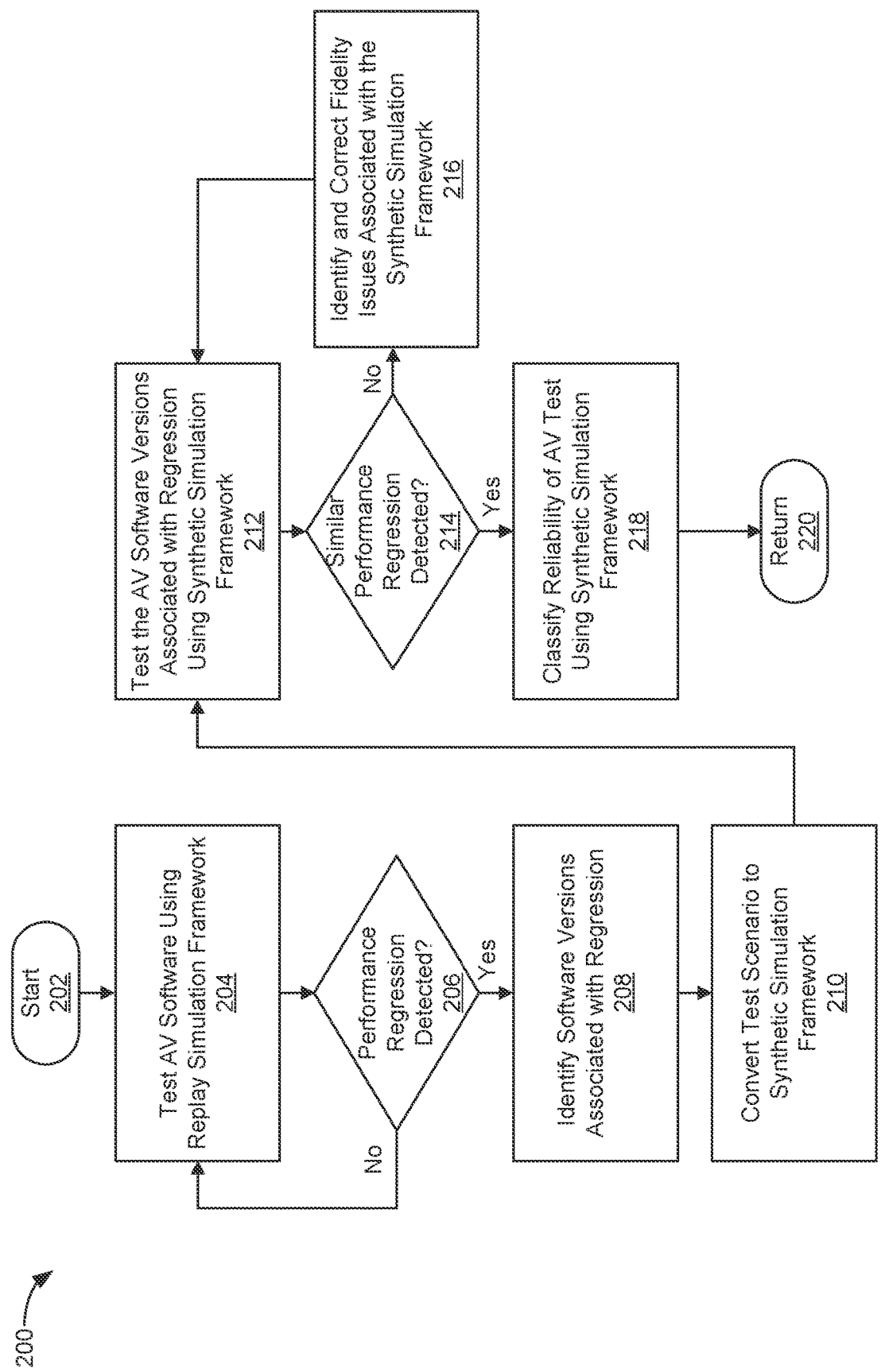
FIG. 2 is a flowchart diagram illustrating an example process for validating a simulation framework, in accordance with some examples of the present disclosure.

FIG. 2 is a flowchart diagram illustrating an example process 200 for validating a simulation framework. In some aspects, process 200 may start at step 202, which may include initializing of hardware or software systems associated with one or more simulation frameworks (e.g., an autonomous vehicle (AV) replay simulation environment, an AV synthetic simulation environment, etc.) and/or with any other computing device that may be configured to execute one or more steps in process 200.

In some examples, process 200 may include step 204 in which software (e.g., AV software) can be tested using a replay simulation framework. In some aspects, a replay simulation framework can generate a simulation environment using real-world data. In some cases, an AV can collect sensor data (e.g., Light Detection and Ranging (LiDAR) sensor data, camera sensor data, radar sensor data, etc.) corresponding to a road environment that can be used by a replay simulation framework to create a simulation of the road environment. For example, an AV may collect LiDAR data corresponding to objects such as cars, buildings, pedestrians, etc. while driving across the intersection of 1$^{st}$ Avenue and Main Street. In some instances, a replay simulation framework can use the real-world LiDAR data collected by the AV to test the AV software by simulating a test scenario occurring at the intersection of 1$^{st}$ Avenue and Main Street (e.g., the real-world LiDAR data can be used to simulate LiDAR sensor readings corresponding to the buildings, pedestrians, cars, etc. in the simulation environment).

In some aspects, a test scenario (e.g., executed using the replay simulation framework) can be associated with a simulation metric. In some cases, a simulation metric can be associated with a test objective. For example, a simulation metric can include a safety score (e.g., metric used to quantify safe performance), a passenger comfort score (e.g., metric used to quantify passenger comfort), a distance measurement (e.g., distance between AV and a pedestrian), a time measurement (e.g., time to collision, crawl time, etc.), an AV behavior (e.g., unprotected left turn, safe stop, etc.), and/or any other metric that may be associated with a simulated test objective. In one illustrative example, a replay simulation framework can be used to test the AV's performance of an unprotected left turn (e.g., left turn facing oncoming traffic without a turn signal) and the simulation metric may include the distance between the AV and an oncoming vehicle while performing the left turn.

In some cases, process 200 may include step 206 in which a performance regression may be detected based on the test scenario executed using the replay simulation framework. In some aspects, a performance regression may correspond to a degradation or a change in AV performance. In some instances, a performance regression may be determined based on the simulation metric associated with a test scenario. For example, the replay simulation framework can be used to perform the same test on different versions of software that may result in a safety score decreasing from a value of 1 to a value of 0.9 (e.g., a simulation metric delta of 0.1). In some cases, a change or reduction in the safety score may be identified as a performance regression. In some aspects, a performance regression may correspond to a threshold change in a simulation metric. For example, a performance regression may be identified if the distance between the AV and another vehicle decreases by 10% or more (e.g., between a first test using a first software version and a second test using a second software version).

In some aspects, if no performance regression is detected at step 206, the process 200 may return to step 204 and continue testing AV software using a replay simulation framework. In some cases, if a performance regression is detected at step 206, the process 200 may continue to step 208 to identify software versions associated with the performance regression. In some cases, identifying the software versions associated with a regression may include identifying a software commit corresponding to a version of software used for a simulation run before the performance regression and a software commit corresponding to a version of software used for a simulation run that exhibited the performance regression.

In some cases, process 200 may include step 210 in which the test scenario associated with the performance regression is converted from the replay simulation framework to a synthetic simulation framework. In some instances, a synthetic simulation framework can correspond to a simulation environment that includes synthetic data (e.g., synthetic sensor data as opposed to real-world sensor data obtained from an AV).

In some aspects, a test scenario may be converted from a replay simulation framework to a synthetic simulation framework by analyzing the simulated scene to identify and select scene assets (e.g., pedestrians, pets, cars, trucks, traffic signals, etc.). In some cases, converting a test scenario to a synthetic simulation framework can include rendering the scene that includes the relevant assets. In some examples, converting a test scenario to a synthetic simulation can include generating synthetic sensor data (e.g., synthetic LiDAR data, synthetic camera data, synthetic RADAR data) that corresponds to the assets in the scene.

In some examples, process 200 can include step 212 in which the AV software versions associated with the performance regression (e.g., threshold change in simulation metric) are tested by using the synthetic simulation framework to run the converted test scenario. At step 214, the process 200 can include determining whether a similar performance regression is detected based on the test scenario executed using the synthetic simulation framework (e.g., as compared to the replay simulation framework). As noted above, a performance regression may be determined based on a change or delta in a simulation metric when testing different versions of software using the same test scenario. For instance, a performance regression may be detected based on a change in a passenger comfort score (e.g., the AV brakes more suddenly in one test).

In some examples, if the performance regression that is detected using the synthetic simulation framework is not similar to the performance regression detected using the replay simulation framework (e.g., delta between the simulation metric among the respective software versions is reduced), the process 200 can proceed to step 216. At step 216, the process 200 can include identifying and correcting fidelity issues associated with the synthetic simulation framework. That is, the unreliability of the synthetic simulation framework (e.g., failure to reproduce the performance regression) may be due to one or more fidelity issues. In some cases, the fidelity issue may correspond to the conversion of the AV test from the replay simulation framework to the synthetic simulation framework. For example, an asset such as a pick-up truck having a bed cover in the replay simulation framework may be improperly rendered in the synthetic simulation framework without a bed cover. In another example, the fidelity issue may be due to the gait of a pedestrian changing as between the replay simulation framework and the synthetic simulation framework. In another example, the fidelity issue may correspond to the synthetic sensor data used in the synthetic simulation framework. For instance, synthetic LiDAR data that causes the AV to identify a pedestrian sooner than it did using real-world LiDAR data (e.g., in the replay simulation framework) may eliminate the performance degradation.

In some cases, after the fidelity issues associated with the synthetic simulation framework are identified and corrected, the process 200 may return to step 212 and repeat the AV test using the modified synthetic simulation framework.

In some aspects, if the performance regression that is detected using the synthetic simulation framework is similar (e.g., within a threshold percentage) as the performance regression detected using the replay simulation framework, the process 200 can proceed to step 218 in which the reliability of the AV test using the synthetic simulation framework is classified. For example, in some cases detecting the same or a similar performance regression can correspond to a high level of reliability (e.g., the test accurately detects performance regressions). In some configurations, after classifying the reliability of the AV test in the synthetic simulation framework the process 200 can proceed to step 220 and return to prior processing, which may include repeating one or more steps from process 200.

Figure 3:
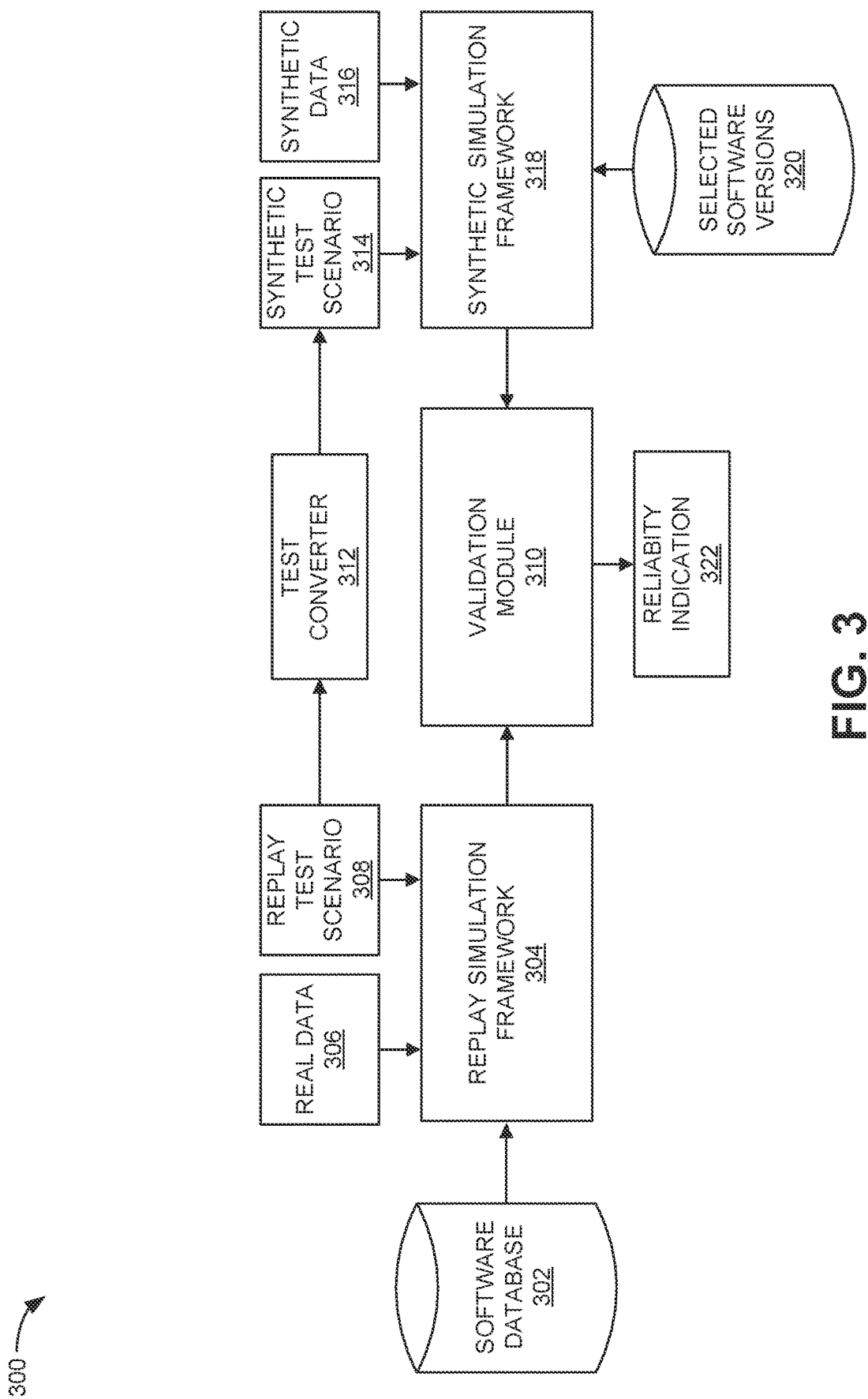
FIG. 3 is a diagram illustrating an example system for validating a simulation framework, in accordance with some examples of the present disclosure.

FIG. 3 illustrates an example system 300 for validating a simulation framework. In some aspects, system 300 may include replay simulation framework 304. In some examples, replay simulation framework 304 can be used to test one or more software versions from software database 302. As noted above, replay simulation framework 304 can generate a simulation environment using real-world data. For example, replay simulation framework 304 can be used to conduct one or more AV tests (e.g., replay test scenario 308) using real data 306. In some cases, real data 306 can include AV sensor data (e.g., LiDAR data, RADAR data, camera data, etc.) collected by one or more AVs from real-world environments. In some configurations, replay test scenario 308 may correspond to a test scenario that includes a scene from a real-world environment corresponding to real data 306.

In some aspects, the output of replay simulation framework 304 can include one or more simulation metrics. In some cases, simulation metrics can include any metric associated with a test intent corresponding to replay test scenario 308. For example, simulation metrics can include safety scores, passenger comfort scores, timing parameters, distance parameters, AV maneuvers, etc.

In some examples, validation module 310 can determine whether different iterations of replay test scenario 308 (e.g., corresponding to different software versions from software database 302) exhibit a performance degradation. In some configurations, validation module 310 may detect a performance degradation when there is a threshold change in a performance metric. In some cases, validation module may identify software versions that correspond to the performance degradation. For instance, validation module 310 can identify software versions among software database 302 from which a threshold change in the simulation metric occurred while running replay test scenario 308 using replay simulation framework 304.

In some examples, the software versions associated with the performance degradation in replay simulation framework 304 can be the selected software versions 320 used to validate synthetic simulation framework 318. In some aspects, synthetic simulation framework 318 may be validated by using the same AV tests that exhibited performance degradations in the replay simulation framework 304 (e.g., using replay test scenario 308). For example, synthetic simulation framework 318 may be validated based on whether it reproduces a similar delta in a simulation metric by using the same AV software and the same AV test.

In some cases, validation module 310 may configure synthetic simulation framework 318 to perform a test (e.g., synthetic test scenario 314) in response to detecting the performance degradation based on simulation metrics from replay simulation framework 304. For example, replay test scenario 308 (e.g., associated with performance degradation) can be converted to synthetic test scenario 314 by test converter 312. In some aspects, test converter 312 may convert replay test scenario 308 to synthetic test scenario 314 by identifying objects in the simulated scene, rendering objects in the simulated scene, and/or generating synthetic sensor data (e.g., synthetic data 316) corresponding to the simulated scene.

In some examples, the output of synthetic simulation framework 318 may include the same simulation metric as the output of replay simulation framework 304. For instance, the output of synthetic simulation framework 318 may include a safety score, a passenger comfort score, timing parameters, distance parameters, AV maneuvers, etc. In some aspects, validation module 310 can determine whether the simulation metrics corresponding to synthetic test scenario 314 using selected software versions 320 results in a similar performance degradation. In some instances, validation module 310 may return a 'high' reliability indication 322 when the observed change in the performance metric corresponding to synthetic simulation framework 318 is within a threshold value of the change in the performance metric corresponding to replay simulation framework 304.

In some aspects, validation module 310 may return a 'low' reliability indication 322 when synthetic simulation framework 318 fails to reproduce the same performance degradation that was observed using replay simulation framework 304 (e.g., degradation or change in simulation metric corresponding to selected software versions 320).

Figure 4:
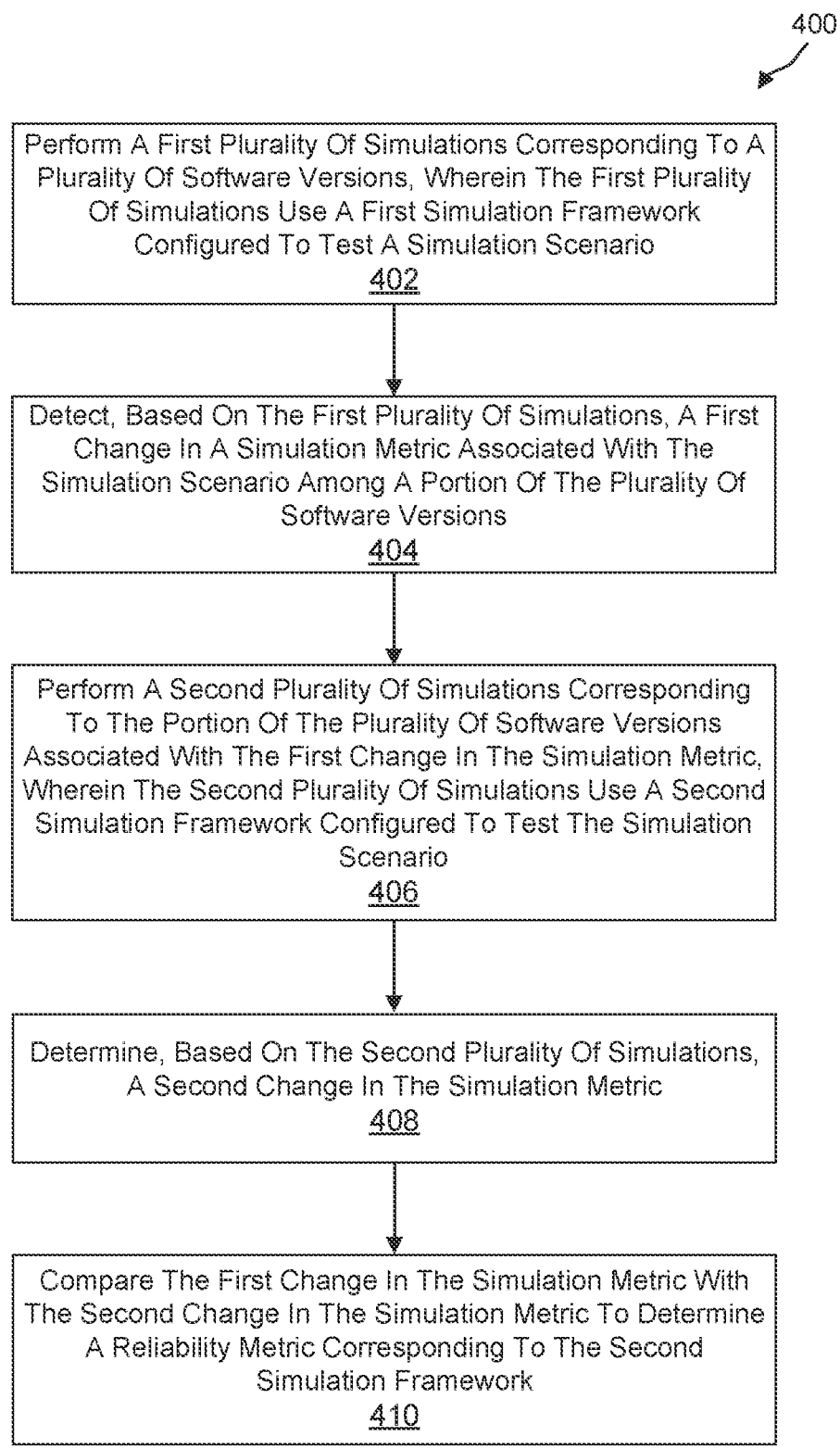
FIG. 4 is a flowchart illustrating another example process for validating a simulation framework, in accordance with some examples of the present disclosure.

FIG. 4 illustrates an example of a process 400 for validating a simulation framework. At block 402, the process 400 includes performing a first plurality of simulations corresponding to a plurality of software versions, wherein the first plurality of simulations use a first simulation framework configured to test a simulation scenario. For instance, replay simulation framework 304 can perform a plurality of simulations corresponding to software versions from software database 302 in order to test replay test scenario 308 using real data 306 (e.g., real-world sensor data).

At block 404, the process 400 includes detecting, based on the first plurality of simulations, a first change in a simulation metric associated with the simulation scenario among a portion of the plurality of software versions. For instance, validation module 310 can detect a change in a simulation metric associated with replay test scenario 308 among a portion of the software versions (e.g., validation module 310 can identify selected software versions 320 that correspond to the change in the simulation metric).

In some cases, the simulation metric associated with the simulation scenario can include at least one of a safety score, a distance measurement, a time measurement, and an autonomous vehicle behavior. In some aspects, the process 400 can include determining that the first change in the simulation metric indicates a regression that exceeds a safety threshold associated with the simulation metric. For example, validation module 310 can determine that a change in a safety score (e.g., associated with replay test scenario 308) is greater than a tolerable change and exceeds a safety threshold associated with the safety score.

At block 406, the process 400 includes performing a second plurality of simulations corresponding to the portion of the plurality of software versions associated with the first change in the simulation metric, wherein the second plurality of simulations use a second simulation framework configured to test the simulation scenario. For example, synthetic simulation framework 318 can perform a second plurality of simulation corresponding to selected software versions 320 in order to test synthetic test scenario 314.

At block 408, the process 400 includes determining, based on the second plurality of simulations, a second change in the simulation metric. For example, validation module 310 can determine a second change in the simulation metric based on the simulation performed by synthetic simulation framework 318.

At block 410, the process 400 includes comparing the first change in the simulation metric with the second change in the simulation metric to determine a reliability metric corresponding to the second simulation framework. For example, validation module 310 can compare the change in the simulation metric from replay simulation framework 304 to the change in the simulation metric from synthetic simulation framework 318 to determine reliability indication 322.

In some aspects, the reliability metric can indicate a high reliability when a difference between the first change in the simulation metric and the second change in the simulation metric is less than a first threshold value. In some examples, the reliability metric may indicate a low reliability when a difference between the first change in the simulation metric and the second change in the simulation metric is greater than a second threshold value.

In some examples, the process 400 may include identifying one or more fidelity issues associated with the low reliability of the second simulation framework, wherein the one or more fidelity issues include at least one of an undetected regression type, a feature type, a scene conversion issue, a scene rendering issue, and a sensor data issue. For instance, validation module 310 may identify one or more fidelity issues associated with the low reliability (e.g., reliability indication 322) of synthetic simulation framework 318.

In some aspects, the process 400 can include converting the simulation scenario from the first simulation framework to the second simulation framework. For example, test converter 312 can convert replay test scenario 308 to synthetic test scenario 314.

In some cases, the first simulation framework can correspond to a replay simulation based on real-world sensor data collected by an autonomous vehicle and the second simulation framework can correspond to a synthetic simulation based on synthetic sensor data. For example, the first simulation framework can correspond to replay simulation framework 304 based on real data 306 and the second simulation framework can correspond to synthetic simulation framework 318 based on synthetic data 316.

Figure 5:
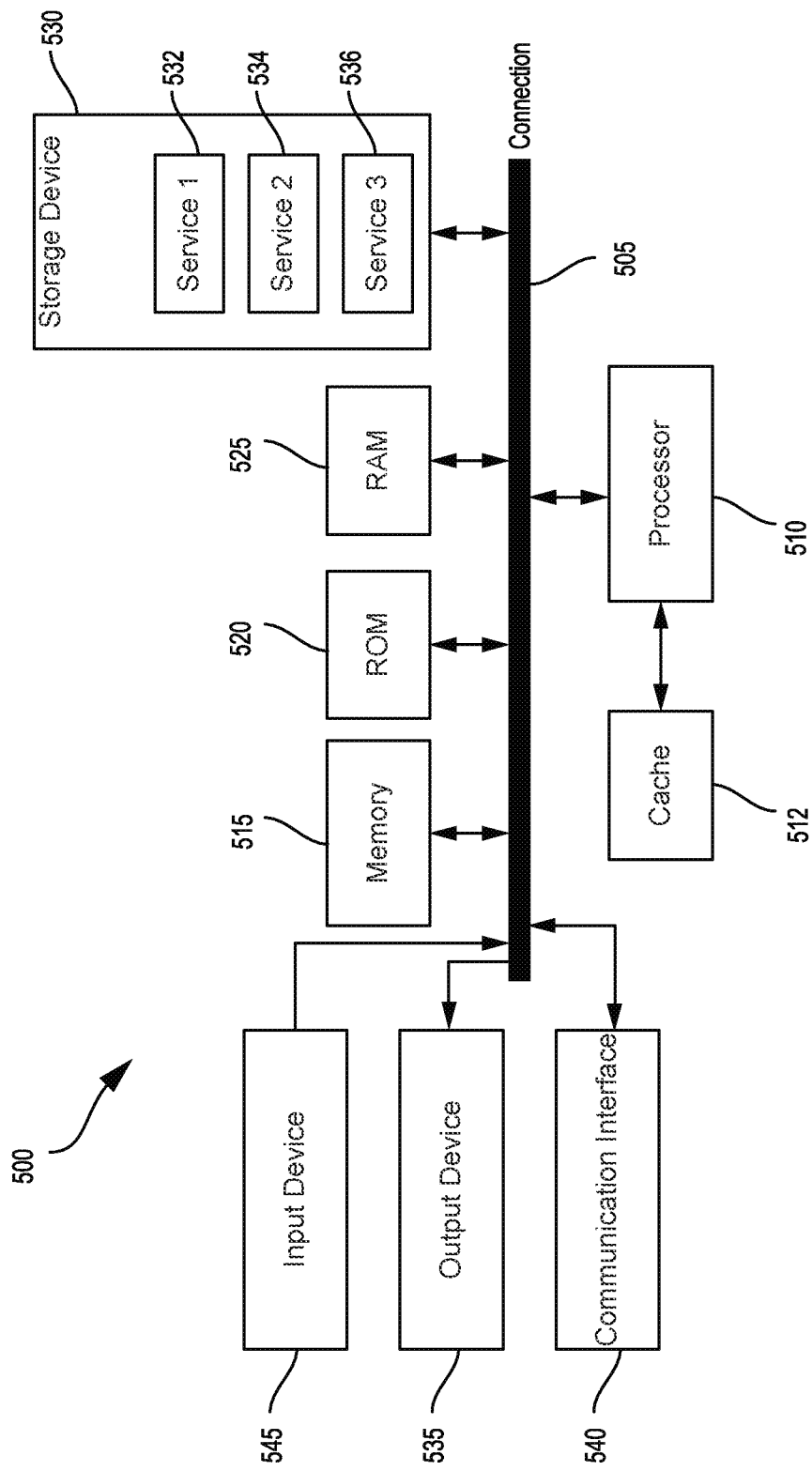
FIG. 5 is a diagram illustrating an example system architecture for implementing certain aspects described herein.

FIG. 5 illustrates an example processor-based system with which some aspects of the subject technology can be implemented. For example, processor-based system 500 can be any computing device making up internal computing system 110, a passenger device executing the ridesharing application 172, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some examples, computing system 500 is a distributed system in which the functions described in this disclosure can be distributed within a datacenter, multiple data centers, a peer network, etc. In some cases, one or more of the described system components represents many such components each performing some or all of the function for which the component is described. In some aspects, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, and/or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 can include an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/9G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L9/L #), resistive random-access memory (RRAM/ReRAM), phase change memory (PCM), spin transfer torque RAM (STT-RAM), another memory chip or cartridge, and/or a combination thereof.

Storage device 530 can include software services, servers, services, etc., that when the code that defines such software is executed by the processor 510, causes the system to perform a function. In some examples, a hardware service that performs a particular function can include the software component stored in a computer-readable medium in connection with the necessary hardware components, such as processor 510, connection 505, output device 535, etc., to carry out the function.

As understood by those of skill in the art, machine-learning techniques can vary depending on the desired implementation. For example, machine-learning schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Aspects within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. By way of example, computer-executable instructions can be used to implement perception system functionality for determining when sensor cleaning operations are needed or should begin. Computer-executable instructions can also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

Selected Examples

Illustrative examples of the disclosure include:

Aspect 1. A method of validating a simulation framework, comprising: performing a first plurality of simulations corresponding to a plurality of software versions, wherein the first plurality of simulations use a first simulation framework configured to test a simulation scenario; detecting, based on the first plurality of simulations, a first change in a simulation metric associated with the simulation scenario among a portion of the plurality of software versions; performing a second plurality of simulations corresponding to the portion of the plurality of software versions associated with the first change in the simulation metric, wherein the second plurality of simulations use a second simulation framework configured to test the simulation scenario; determining, based on the second plurality of simulations, a second change in the simulation metric; and comparing the first change in the simulation metric with the second change in the simulation metric to determine a reliability metric corresponding to the second simulation framework.

Aspect 2. The method of Aspect 1, wherein the reliability metric indicates a high reliability when a difference between the first change in the simulation metric and the second change in the simulation metric is less than a first threshold value.

Aspect 3. The method of any of Aspects 1 to 2, wherein the reliability metric indicates a low reliability when a difference between the first change in the simulation metric and the second change in the simulation metric is greater than a second threshold value.

Aspect 4. The method of Aspect 3, further comprising: identifying one or more fidelity issues associated with the low reliability of the second simulation framework, wherein the one or more fidelity issues include at least one of an undetected regression type, a feature type, a scene conversion issue, a scene rendering issue, and a sensor data issue.

Aspect 5. The method of any of Aspects 1 to 4, wherein the first simulation framework corresponds to a replay simulation based on real-world sensor data collected by an autonomous vehicle and the second simulation framework corresponds to a synthetic simulation based on synthetic sensor data.

Aspect 6. The method of any of Aspects 1 to 5, wherein the simulation metric associated with the simulation scenario includes at least one of a safety score, a distance measurement, a time measurement, and an autonomous vehicle behavior.

Aspect 7. The method of any of Aspects 1 to 6, further comprising: determining that the first change in the simulation metric indicates a regression that exceeds a safety threshold associated with the simulation metric.

Aspect 8. The method of any of Aspects 1 to 7, further comprising: converting the simulation scenario from the first simulation framework to the second simulation framework.

Aspect 9. An apparatus comprising: at least one memory; and at least one processor coupled to the at least one memory, wherein the at least one processor is configured to perform operations in accordance with any one of Aspects 1 to 8.

Aspect 10. An apparatus comprising means for performing operations in accordance with any one of Aspects 1 to 8.

Aspect 11. A non-transitory computer-readable medium comprising instructions that, when executed by an apparatus, cause the apparatus to perform operations in accordance with any one of Aspects 1 to 8.

The various examples described above are provided by way of illustration only and should not be construed to limit the scope of the disclosure. For example, the principles herein apply equally to optimization as well as general improvements. Various modifications and changes may be made to the principles described herein without following the examples and applications illustrated and described herein, and without departing from the scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. An apparatus comprising:
   at least one memory; and
   at least one processor coupled to the at least one memory, wherein the at least one processor is configured to:
      perform a first plurality of simulations corresponding to a plurality of software versions, wherein the first plurality of simulations use a first simulation framework configured to test a simulation scenario;
      detect, based on the first plurality of simulations, a first change in a simulation metric associated with the simulation scenario among a portion of the plurality of software versions;
      perform a second plurality of simulations corresponding to the portion of the plurality of software versions associated with the first change in the simulation metric, wherein the second plurality of simulations use a second simulation framework configured to test the simulation scenario;
      determine, based on the second plurality of simulations, a second change in the simulation metric; and
      compare the first change in the simulation metric with the second change in the simulation metric to determine a reliability metric corresponding to the second simulation framework.

2. The apparatus of claim 1, wherein the reliability metric indicates a high reliability when a difference between the first change in the simulation metric and the second change in the simulation metric is less than a first threshold value.

3. The apparatus of claim 1, wherein the reliability metric indicates a low reliability when a difference between the first change in the simulation metric and the second change in the simulation metric is greater than a second threshold value.

4. The apparatus of claim 3, wherein the at least one processor is further configured to:

identify one or more fidelity issues associated with the low reliability of the second simulation framework, wherein the one or more fidelity issues include at least one of an undetected regression type, a feature type, a scene conversion issue, a scene rendering issue, and a sensor data issue.

5. The apparatus of claim 1, wherein the first simulation framework corresponds to a replay simulation based on real-world sensor data collected by an autonomous vehicle and the second simulation framework corresponds to a synthetic simulation based on synthetic sensor data.

6. The apparatus of claim 1, wherein the simulation metric associated with the simulation scenario includes at least one of a safety score, a distance measurement, a time measurement, and an autonomous vehicle behavior.

7. The apparatus of claim 1, wherein the at least one processor is further configured to:
determine that the first change in the simulation metric indicates a regression that exceeds a safety threshold associated with the simulation metric.

8. The apparatus of claim 1, wherein the at least one processor is further configured to:
convert the simulation scenario from the first simulation framework to the second simulation framework.

9. A method of validating a simulation framework, comprising:
performing a first plurality of simulations corresponding to a plurality of software versions, wherein the first plurality of simulations use a first simulation framework configured to test a simulation scenario;
detecting, based on the first plurality of simulations, a first change in a simulation metric associated with the simulation scenario among a portion of the plurality of software versions;
performing a second plurality of simulations corresponding to the portion of the plurality of software versions associated with the first change in the simulation metric, wherein the second plurality of simulations use a second simulation framework configured to test the simulation scenario;
determining, based on the second plurality of simulations, a second change in the simulation metric; and
comparing the first change in the simulation metric with the second change in the simulation metric to determine a reliability metric corresponding to the second simulation framework.

10. The method of claim 9, wherein the reliability metric indicates a high reliability when a difference between the first change in the simulation metric and the second change in the simulation metric is less than a first threshold value.

11. The method of claim 9, wherein the reliability metric indicates a low reliability when a difference between the first change in the simulation metric and the second change in the simulation metric is greater than a second threshold value.

12. The method of claim 11, further comprising:
identifying one or more fidelity issues associated with the low reliability of the second simulation framework, wherein the one or more fidelity issues include at least one of an undetected regression type, a feature type, a scene conversion issue, a scene rendering issue, and a sensor data issue.

13. The method of claim 9, wherein the first simulation framework corresponds to a replay simulation based on real-world sensor data collected by an autonomous vehicle and the second simulation framework corresponds to a synthetic simulation based on synthetic sensor data.

14. The method of claim 9, wherein the simulation metric associated with the simulation scenario includes at least one of a safety score, a distance measurement, a time measurement, and an autonomous vehicle behavior.

15. The method of claim 9, further comprising:
determining that the first change in the simulation metric indicates a regression that exceeds a safety threshold associated with the simulation metric.

16. The method of claim 9, further comprising:
converting the simulation scenario from the first simulation framework to the second simulation framework.

17. A non-transitory computer-readable storage medium having stored thereon instructions which, when executed by one or more processors, cause the one or more processors to:
perform a first plurality of simulations corresponding to a plurality of software versions, wherein the first plurality of simulations use a first simulation framework configured to test a simulation scenario;
detect, based on the first plurality of simulations, a first change in a simulation metric associated with the simulation scenario among a portion of the plurality of software versions;
perform a second plurality of simulations corresponding to the portion of the plurality of software versions associated with the first change in the simulation metric, wherein the second plurality of simulations use a second simulation framework configured to test the simulation scenario;
determine, based on the second plurality of simulations, a second change in the simulation metric; and
compare the first change in the simulation metric with the second change in the simulation metric to determine a reliability metric corresponding to the second simulation framework.

18. The non-transitory computer-readable storage medium of claim 17, wherein the reliability metric indicates a low reliability when a difference between the first change in the simulation metric and the second change in the simulation metric is greater than a second threshold value.

19. The non-transitory computer-readable storage medium of claim 18, comprising further instructions which, when executed by the one or more processors, cause the one or more processors:
identify one or more fidelity issues associated with the low reliability of the second simulation framework, wherein the one or more fidelity issues include at least one of an undetected regression type, a feature type, a scene conversion issue, a scene rendering issue, and a sensor data issue.

20. The non-transitory computer-readable storage medium of claim 17, wherein the first simulation framework corresponds to a replay simulation based on real-world sensor data collected by an autonomous vehicle and the second simulation framework corresponds to a synthetic simulation based on synthetic sensor data.

* * * * *